US011740840B2

(12) United States Patent
Sakai

(10) Patent No.: US 11,740,840 B2
(45) Date of Patent: Aug. 29, 2023

(54) STORAGE MEDIUM, INFORMATION PROCESSING APPARATUS, AND CONTROL METHOD

(71) Applicant: CANON KABUSHIKI KAISHA, Tokyo (JP)

(72) Inventor: Hiroyuki Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/869,663

(22) Filed: Jul. 20, 2022

(65) Prior Publication Data

US 2023/0030556 A1 Feb. 2, 2023

(30) Foreign Application Priority Data

Jul. 29, 2021 (JP) .................................. 2021-124183

(51) Int. Cl.
*G06F 3/12* (2006.01)

(52) U.S. Cl.
CPC .............. *G06F 3/1208* (2013.01); *G06F 3/125* (2013.01); *G06F 3/1256* (2013.01); *G06F 3/12* (2013.01)

(58) Field of Classification Search
CPC ........ G06F 3/1208; G06F 3/125; G06F 3/1256
USPC ....................................................... 358/1.13
See application file for complete search history.

(56) References Cited

U.S. PATENT DOCUMENTS

| 6,239,817 B1* | 5/2001 | Meyer .................. B41J 2/1721 347/36 |
| 6,834,929 B1* | 12/2004 | Adams et al. ....... B41J 11/0065 347/14 |
| 2014/0086605 A1* | 3/2014 | Yoshida et al. ...... G03G 15/234 399/45 |

FOREIGN PATENT DOCUMENTS

JP        2002-373068 A    12/2002

* cited by examiner

*Primary Examiner* — Darryl V Dottin
(74) *Attorney, Agent, or Firm* — Canon U.S.A., Inc. IP Division

(57) ABSTRACT

Arrangement processing for arranging image data on a printing medium can differ according to a printer type, and it may not be possible to obtain the print product intended by a user. A method is provided that includes determining, at a processor configured to perform the determining, to perform processing for generating image data without appending margins in a case where the printer type is identified to be a large-format printer based on printer type information, and determining, at the processor configured to perform the determining, to perform processing for generating the image data with appended margins in a case where the printer type is identified to be a small-format printer based on the printer type information and borderless printing is identified to be executed based on print setting information.

15 Claims, 10 Drawing Sheets

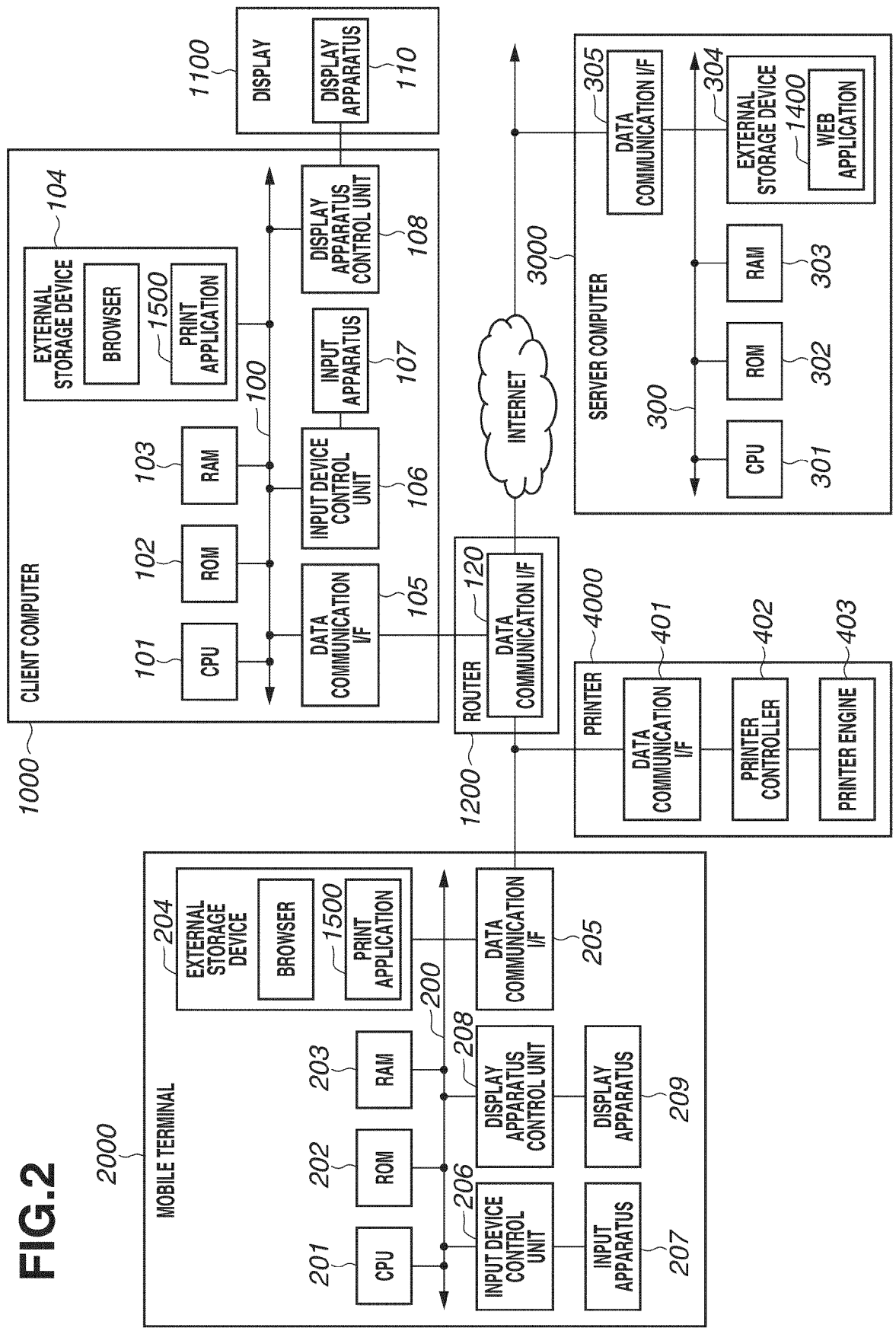

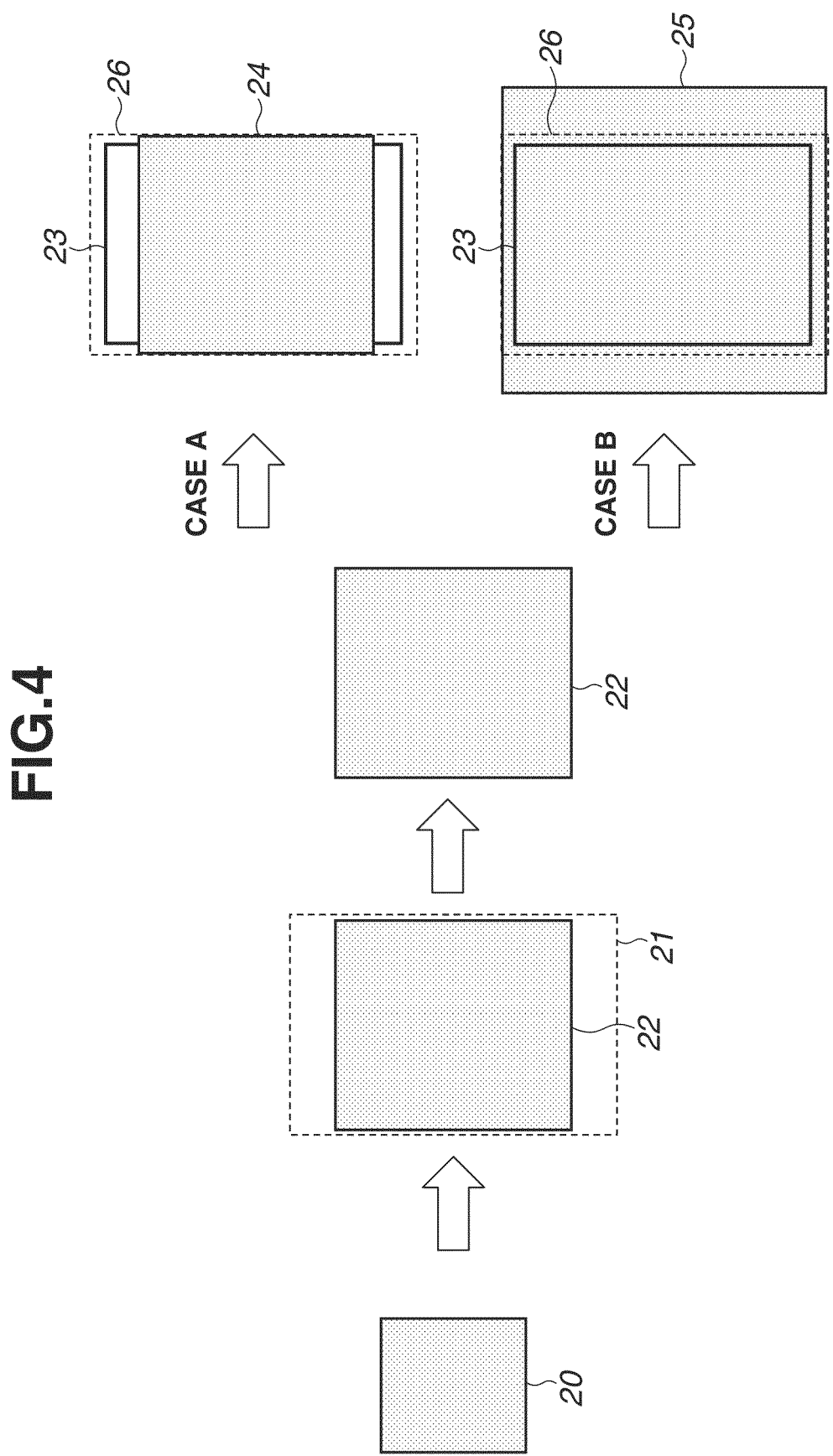

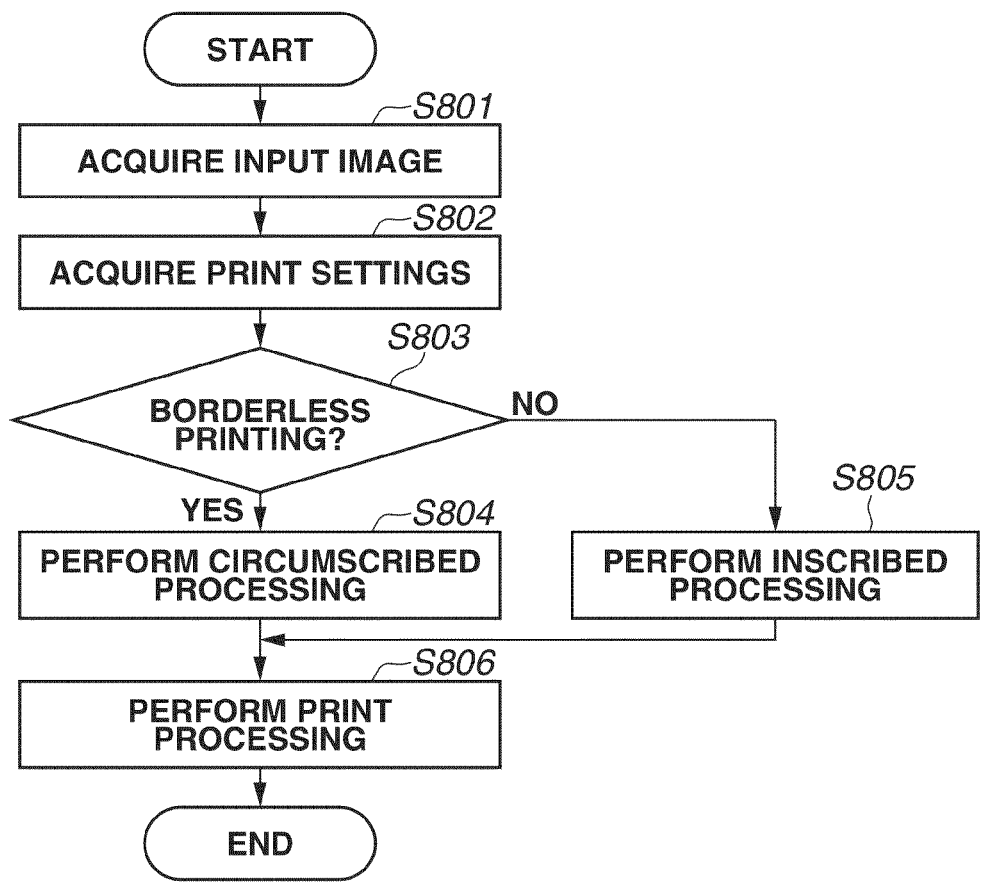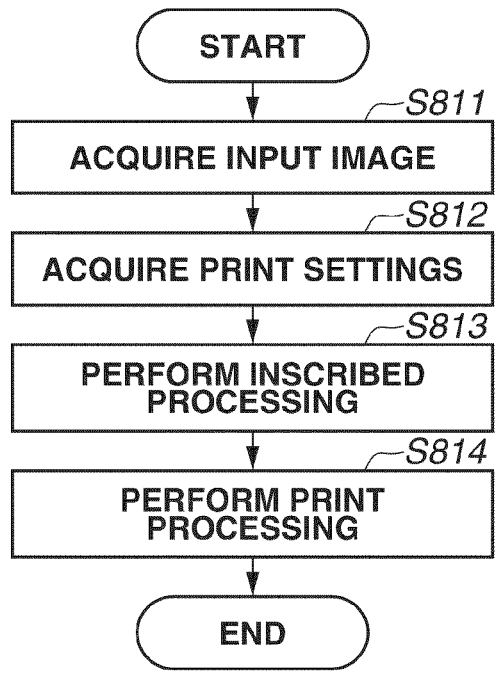

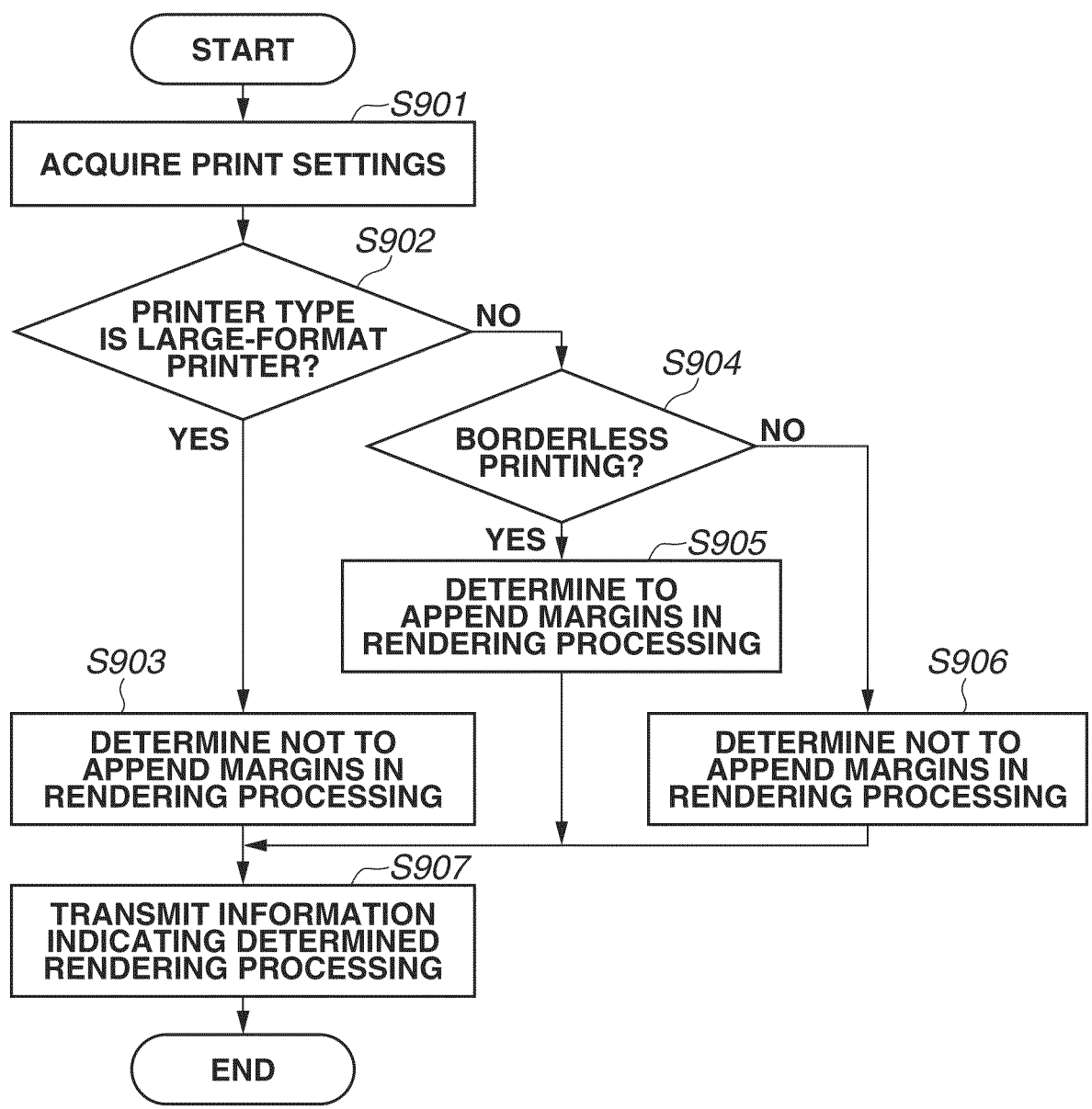

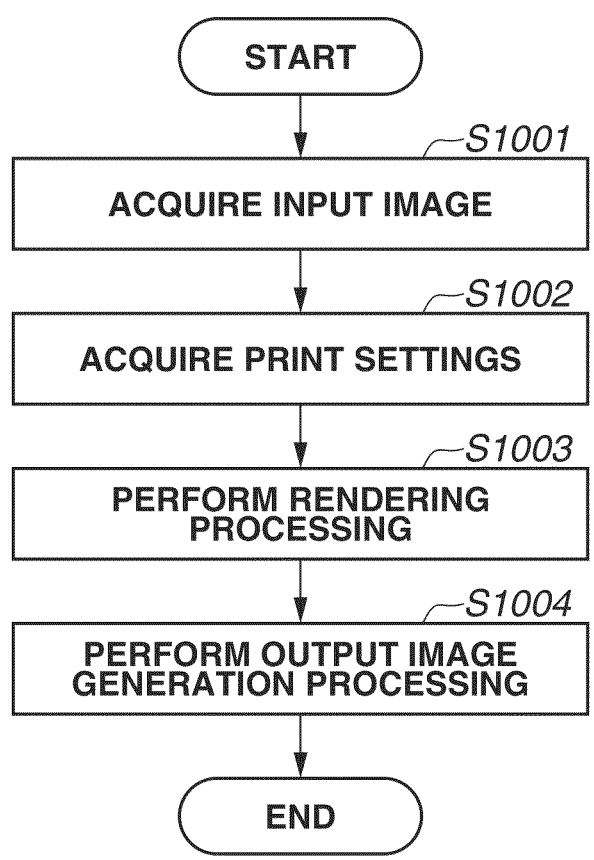

STORAGE MEDIUM, INFORMATION PROCESSING APPARATUS, AND CONTROL METHOD

BACKGROUND

Field

The present disclosure relates to a storage medium, an information processing apparatus, and a control method.

Description of the Related Art

A method is known to transmit image data to a printing apparatus (hereinafter referred to as a printer) via a printer driver to achieve image printing. For example, Japanese Patent Application Laid-Open No. 2002-373068 discusses a technique for performing image processing related to printing and display via a printer driver and then transmitting image data to a printer.

The result of printing (output) may possibly differ according to the type of the printer used as an image data transmission destination. For example, arrangement processing performed by the printer to arrange the image data on a recording medium may be changed according to the type of the printer used as an image data transmission destination. As a result, a difference arises in the printing (output) result, and it may not be possible to acquire the print product intended by the user.

SUMMARY

According to various embodiments of the present disclosure, a method is provided that includes acquiring print setting information about printing of image data including setting information about borderless printing, acquiring printer type information about a type of a printer for printing the image data, and determining, at a processor configured to perform the determining, to perform processing for generating the image data without appending margins in a case where the printer type is identified to be a large-format printer based on the printer type information, and determining, at the processor configured to perform the determining, to perform processing for generating the image data with appended margins in a case where the printer type is identified to be a small-format printer based on the printer type information and the borderless printing is identified to be executed based on the print setting information.

Further features of the present disclosure will become apparent from the following description of example embodiments with reference to the attached drawings.

BRIEF DESCRIPTION OF THE DRAWINGS

FIG. 2 illustrates a hardware configuration of the system.

FIG. 4 illustrates an issue that a difference arises in print results.

FIGS. 8A and 8B are flowcharts illustrating processing in which a small-format printer or a large-format printer determines image arrangement processing and performs print processing.

FIG. 9 is a flowchart illustrating processing in which the print application determines rendering processing according to the printer type and the borderless printing settings.

FIG. 10 is a flowchart illustrating the rendering processing performed by a server computer.

DESCRIPTION OF THE EMBODIMENTS

Figure 1:
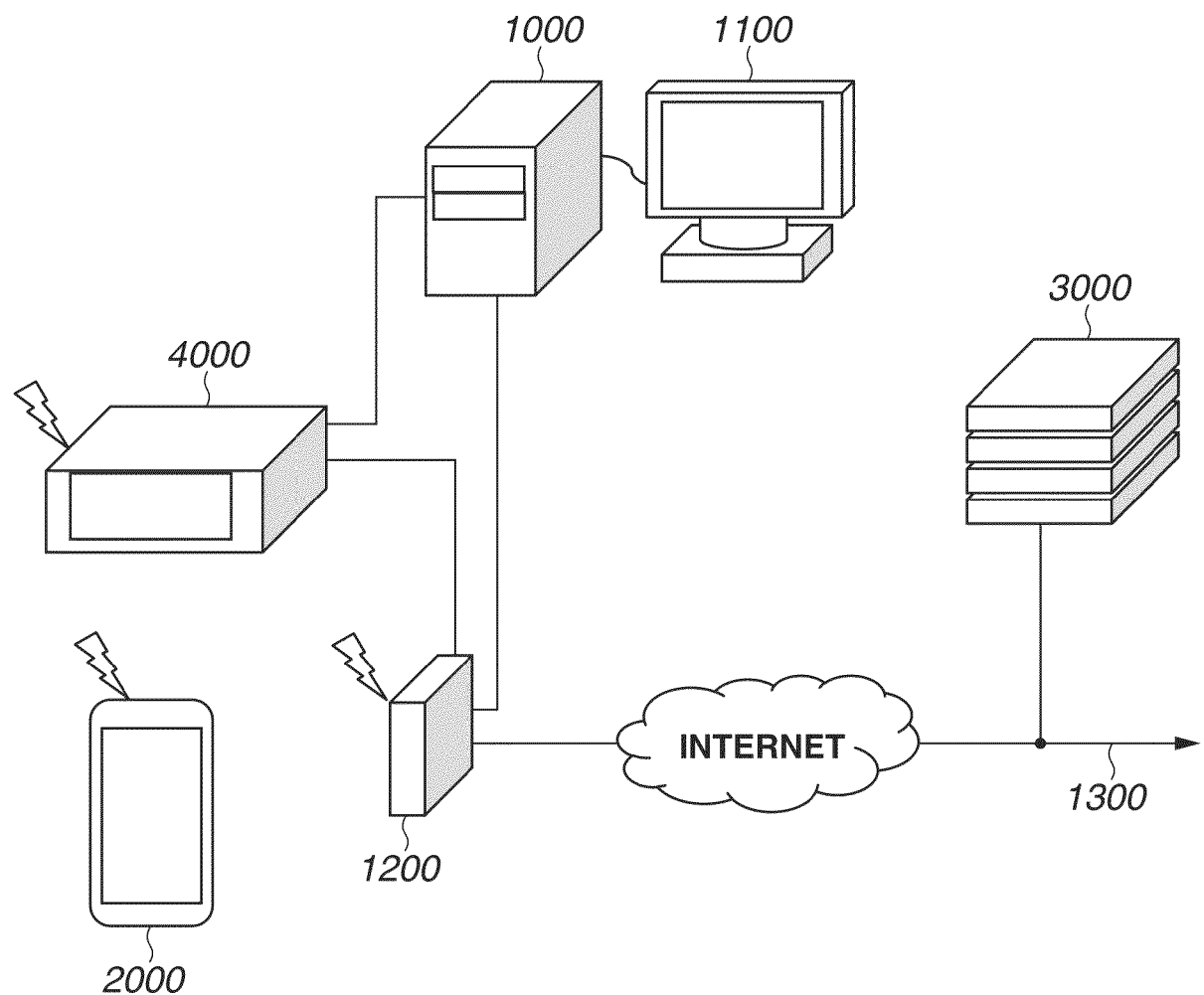
FIG. 1 illustrates a configuration of a system.

Example embodiments of the present disclosure will be described in detail below with reference to the accompanying drawings. The following example embodiments do not limit the present disclosure within the ambit of the appended claims. Not all of the combinations of the features described in the present example embodiment are indispensable to the solutions for the present disclosure. In the accompanying drawings, identical or similar components are assigned the same reference numerals, and duplicated descriptions thereof will be omitted.

FIG. 1 illustrates a system configuration according to a first example embodiment. The system configuration of the present example embodiment includes a client computer 1000, a display 1100, a router 1200, a mobile terminal 2000, a server computer 3000, and a printer 4000.

The client computer 1000 is connected with the router 1200 via wired or wireless communication, and connected with other communication apparatuses through the Internet 1300 via the router 1200.

The display 1100 is connected with the client computer 1000 via a communication cable, and displays data stored in the client computer 1000 on a display (screen). The client computer 1000 and the display 1100 may be integrated as one apparatus.

The mobile terminal 2000 is connected with the router 1200 via wireless communication, and communicates with other communication apparatuses via the router 1200 and the Internet 1300.

The server computer 3000 can communicate with other communication apparatuses through the Internet 1300. The server computer 3000 receives data stored in the client computer 1000 and the mobile terminal 2000, stores the data in a memory (an external storage device 304 to be described below with reference to FIG. 2), processes the data, and transmits the data to other apparatuses. The function implemented by the server computer 3000 may be implemented by one information processing apparatus or implemented by a plurality of information processing apparatuses operating in a collaborative way.

The printer 4000 is connected with the router 1200 via wired or wireless communication, and communicates with other communication apparatuses via the router 1200 and the Internet 1300. The printer 4000 also receives data stored in the client computer 1000, the mobile terminal 2000, or the server computer 3000 and performs printing on a printing medium based on the received data.

Examples of communication methods used for connection between the apparatuses include the Institute of Electrical and Electronics Engineers (IEEE) 802.11 Series communication standard (Wi-Fi) and Bluetooth (Bluetooth® Classic and Bluetooth® Low Energy (BLE)). Examples of communication methods also include Universal Serial Bus (USB), IEEE1394, Local Area Network (LAN), and other wired connections. Further, each apparatus may perform communication through mobile communications (3G, 4G, and 5G).

The client computer 1000 is, for example, a personal computer (PC). The mobile terminal 2000 is, for example, a tablet computer or smart phone. Examples of printing methods of the printer 4000 used in the present example embodiment include the electrophotographic method, the ink-jet printing method, and other methods.

FIG. 2 illustrates a hardware configuration of the system according to the present example embodiment.

The client computer 1000 includes a central processing unit (CPU) 101, a read only memory (ROM) 102, a random access memory (RAM) 103, an external storage device 104, a data communication interface (I/F) 105, an input device control unit 106, an input apparatus 107, and a display apparatus control unit 108.

The CPU 101 as a central processing unit performs processing according to a specified program. For example, the CPU 101 receives programs and image data stored in the ROM 102, the RAM 103, and the external storage device 104 and executes calculation processing.

The ROM 102 as a nonvolatile storage can store table data and programs used in processing of each example embodiment (described below).

The RAM 103 as a volatile storage temporarily stores programs and data.

The external storage device 104 as a nonvolatile storage stores programs and data. For example, the external storage device 104 holds a browser and a print application 1500.

The data communication I/F 105 controls data transmission and reception between the client computer 1000 and the server computer 3000 and between the client computer 1000 and the printer 4000 via the router 1200. The data communication I/F 105 may also control data transmission and reception between the client computer 1000 and the mobile terminal 2000.

The input device control unit 106 is an interface that acquires information operated by a user and transmits control information to each processing unit.

The input apparatus 107 is a Human Interface Device (HID) such as a keyboard and a mouse. The user can perform an input operation via the input apparatus 107.

The display apparatus control unit 108 is an interface that transmits drawing data stored in the ROM 102, the RAM 103, and the external storage device 104 to the display 1100.

The display 1100 includes a display apparatus 110. The display apparatus 110 displays the drawing data received from the display apparatus control unit 108 of the client computer 1000 on the display (screen).

The router 1200 including a data communication I/F 120 controls data transmission and reception with the client computer 1000, the mobile terminal 2000, the server computer 3000, and the printer 4000.

The mobile terminal 2000 includes a CPU 201, a ROM 202, a RAM 203, an external storage device 204, a data communication I/F 205, an input device control unit 206, an input apparatus 207, a display apparatus control unit 208, and a display apparatus 209.

The CPU 201, the ROM 202, the RAM 203, the external storage device 204, and the input device control unit 206 have similar configurations to the CPU 101, the ROM 102, the RAM 103, the external storage device 104, and the input device control unit 106, respectively.

The data communication I/F 205 controls data transmission and reception between the mobile terminal 2000 and the printer 4000. The mobile terminal 2000 may perform data transmission and reception with the printer 4000 by using, for example, Wi-Fi Direct® without interposing the router 1200. The data communication I/F 205 may control data transmission and reception with the client computer 1000 or the server computer 3000.

The input apparatus 207 is provided with a similar apparatus to the input apparatus 107 as well as display and input functions of a tablet computer and a smart phone, enabling the user to perform operations on the screen. The input apparatus 207 is provided with, for example, a touch panel.

The display apparatus control unit 208 is an interface that transmits drawing data stored in the ROM 202, the RAM 203, and the external storage device 204 to the display apparatus 209.

The display apparatus 209 displays the drawing data received from the display apparatus control unit 208. The display apparatus 209 is often built in the mobile terminal 2000.

The server computer 3000 includes a CPU 301, a ROM 302, a RAM 303, an external storage device 304, and a data communication I/F 305.

The CPU 301, the ROM 302, and the RAM 303 have similar configurations to the CPU 101, the ROM 102, and the RAM 103, respectively.

The external storage device 304 as a nonvolatile storage stores programs and data. For example, the external storage device 304 holds a web application 1400.

The data communication I/F 305 controls data transmission and reception with the client computer 1000 or the printer 4000 via the router 1200. The data communication I/F 305 may control data transmission and reception with the mobile terminal 2000. The data communication I/F 305 can transmit print data. The print data includes an image file generated by subjecting image data to be used mainly for printing to data size reduction processing, and print setting data related to image data printing for issuing a print instruction. The print setting data includes setting information such as the paper size, whether two-sided printing is specified, whether borderless printing is specified, and whether to use special ink.

The printer 4000 includes a data communication I/F 401, a printer controller 402, and a printer engine 403.

The data communication I/F 401 controls data transmission and reception with the client computer 1000, the mobile terminal 2000, and the server computer 3000 via the router 1200. The data communication I/F 401 receives print data generated in any one of the client computer 1000, the mobile terminal 2000, and the server computer 3000. The print data includes an image file generated by subjecting image data to be used mainly for printing to data size reduction processing, and print setting data for issuing a print instruction. The print setting data includes the paper size, whether two-sided printing is specified, whether borderless printing is specified, and whether to use special ink.

The printer controller 402 controls the printer engine 403 according to instruction data included in the received print data. The printer controller 402 converts the image data by using color space conversion and color separation into a color material, which are necessary for printing, according to the paper type as print setting data. The printer controller 402 further converts the image data into printable recording data by performing image processing, such as output gradation correction and half-toning, based on a look-up table and other image processing parameters. The printer controller 402 includes a CPU, a ROM, and a RAM. The CPU of the printer controller 402 performs processing in the flowcharts in FIGS. 8A and 8B (described below). More specifically, the printer controller 402 determines whether to perform inscribed processing or circumscribed processing as arrangement processing for printing image data D3

(described below) and then performs the arrangement processing for the printing image data D3. The RAM and the ROM of the printer controller 402 have similar configurations to the ROM 102 and the RAM 103, respectively.

The printer engine 403 converts image data of the received print data into each piece of ink color data and then performs print processing. The main processing of the print processing controls the heating and pressurizing operations of the heater mounted on the print head based on the recording data for the print head to discharge ink.

Data related to the generation of output image data to be transmitted to the server computer 3000 will be described below. The web application 1400 and the print application 1500 described below and settings are to be considered as illustrative, and are not limited thereto. Further, the data related to the generation of the output image data is not necessarily generated in the following processing flow and transmitted to the server computer 3000.

The client computer 1000 or the mobile terminal 2000 holds a browser and the print application 1500 that performs print setting. The user activates the browser on the screen of the client computer 1000 (display 1100) or the screen of the mobile terminal 2000 and accesses the Uniform Resource Locator (URL) of the web application 1400. Thus, the web application 1400 to be used by the browser is transmitted to the client computer 1000 or the mobile terminal 2000. The browser uses the transmitted web application 1400 to display the screen of the web application 1400 according to a user operation. The web application 1400 is held by the server computer 3000. For example, when the user inputs image data on the web application 1400 by using the screen of the web application 1400, the input image data is transmitted to the server computer 3000, and a preview image of the image data is displayed on the screen of the web application 1400. When the user performs an editing operation on the browser in response to the preview image, a preview image reflecting the editing operation is generated on the server computer 3000 and displayed on the browser. The web application 1400 to be used by the browser may not be transmitted to the client computer 1000 or the mobile terminal 2000, and the server computer 3000 may perform the operation according to the user operation. The contents of the operation and the preview image may be displayed on the screen of the client computer 1000 or the mobile terminal 2000, and are not limited thereto.

The user edits an image and sets an image region where special ink is used, on the screen of the web application 1400. Information about the operation performed on the screen of the web application 1400 is transmitted to the server computer 3000 as required. Then, when the user presses, for example, the "Next" button 706 on the screen of the web application 1400, the print application 1500 is activated. Information about the operation performed on the screen of the web application 1400 may be transmitted to the print application 1500 and then, upon depression of a "Print" button 708 (described below) for example, transmitted to the server computer 3000.

For example, the user selects a printer and sets the paper type, the paper size, whether to use special ink, whether borderless printing is specified, and the use intensity of special ink, and then presses the "Print" button 708 on screen of the print application 1500.

Figure 3A:
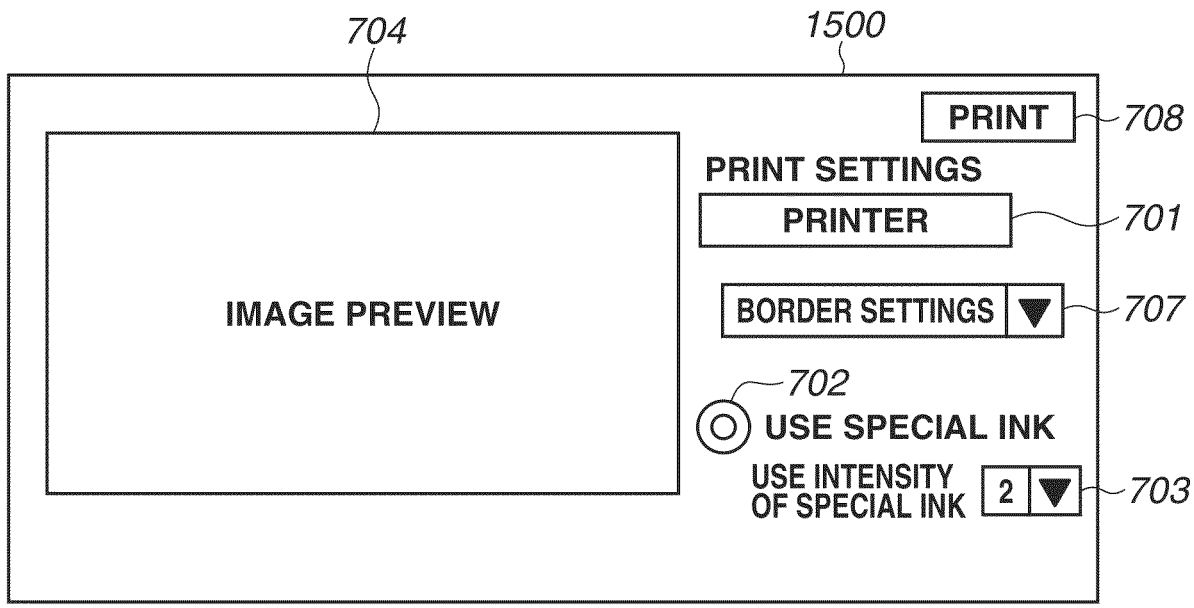
FIGS. 3A and 3B illustrate a print application screen and a web application screen, respectively.
Figure 3B:
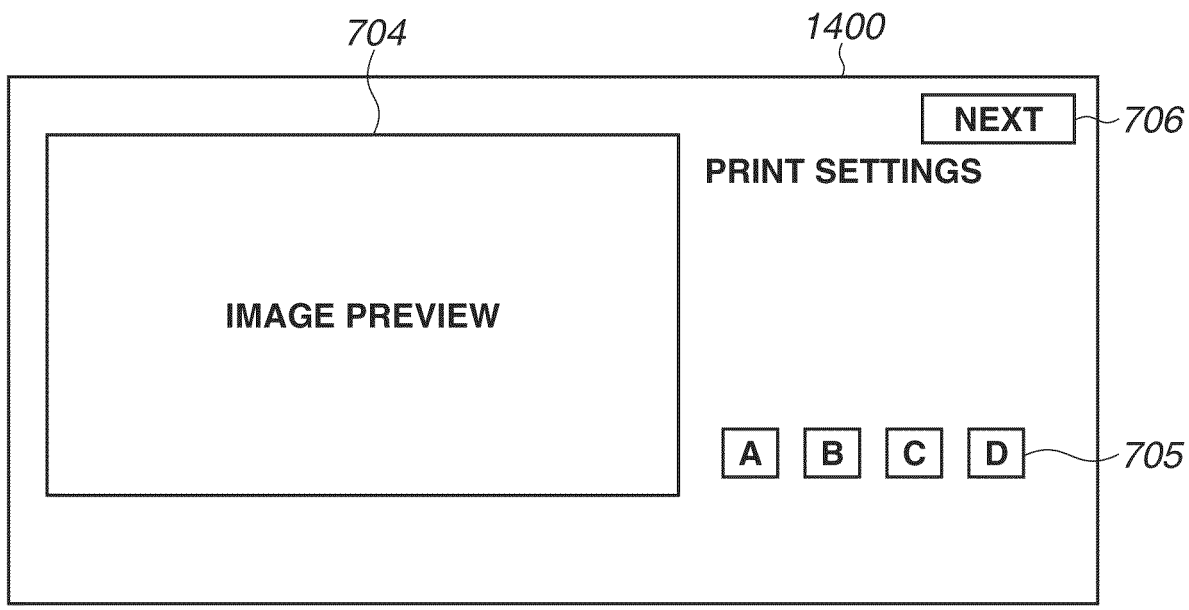

For example, FIGS. 3A and 3B illustrates a screen of the web application 1400 and a screen of the print application 1500. FIG. 3A illustrates a screen of the print application 1500, and FIG. 3B illustrates a screen of the web application 1400. As illustrated in FIGS. 3A and 3B, the user edits an image in a region 704 in FIG. 3B and sets an image region where special ink is used, by using setting items 705. The user selects a color (one of colors A, B, C, and D) using special ink for the selected image region, by using the setting items 705. Each color using special ink has a predetermined specific red, green, and blue (RGB) values (not displayed) corresponding to special ink. For example, when the user presses the "Next" button 706, for example, on the screen in FIG. 3B, the print application 1500 in FIG. 3A is activated. The user selects a printer (printer driver) by using a setting item 701, and sets whether to use special ink by using a setting item 702 and the use intensity of special ink by using a setting item 703. The use intensity of special ink refers to the ratio of the amount of special ink to be used in color printing using special ink. The setting item 701 is a combo box for accepting a specification of the printer (printer driver) to be used for printing from the user. For example, the setting item 703 is a combo box for selecting a setting value "0", "1", "2", or "3" that indicates the use intensity of special ink "Lowest", "Low", "Normal", or "High", respectively. For example, when the user wants to specify "Normal" as the use intensity of special ink, the user selects "2" by using the setting item 703. The setting value of the setting item 703 is not limited thereto. The user also sets the paper type, the paper size, and other print settings (not illustrated) on the screen in FIG. 3A. Print Settings indicates whether borderless printing is specified. For example, a setting item 707 is a combo box for accepting the specification of either borderless printing or bordered printing.

Then, the user presses a "Print" button 708 on the screen in FIG. 3A. When the user presses the "Print" button 708, the information set on the screen of the print application 1500 and an image data generation instruction are transmitted to the server computer 3000. Referring to FIG. 3B, the setting items 702 and 703 may be displayed on the screen of the web application 1400 for performing various settings. In addition, the information set on the screen of the print application 1500 and an image data generation instruction may be transmitted to the server computer 3000 by using an operation other than the operation of the "Print" button 708 as a trigger.

Rendering processing will be described below. The rendering processing refers to processing in which printing image data (hereinafter referred to as printing image data D3) is generated by using input image data (hereinafter referred to as input image data D1) input by the user and print setting data (hereinafter referred to as print setting data D2) set by the user. More specifically, the image size of the image data having been subjected to at least either one of enlargement processing and reduction processing (hereinafter referred to as enlargement/reduction processing) is calculated so that the input image data D1 fits into a printable region. Then, the image data is arranged in the calculated printable region, and the printing image data D3 is generated. The printing image data D3 generated by the server computer 3000 is transmitted to a printer, and printing is performed based on the printing image data D3. The rendering processing will be described in detail below with reference to FIG. 6.

The arrangement processing in which the printer arranges the printing image data D3 having been subjected to the above-described rendering processing may differ according to whether the printer type is a large-format or a small-format printer. In this case, the print result (print product) may be different according to the printer type. More specifically, when the printer type is a large-format printer, the inscribed processing (described below) is performed as the arrangement processing for the printing image data D3. When the printer type is a small-format printer, the arrangement processing for the printing image data D3 differs according to whether borderless printing is set. In this case, the print result may be different according to the borderless printing setting. More specifically, when the printer type is a small-format printer and borderless printing is set, the circumscribed processing (described below) is performed as the arrangement processing for the printing image data D3. When the printer type is a small-format printer and borderless printing is not set, the inscribed processing (described below) is performed as the arrangement processing for the printing image data D3.

Therefore, when borderless printing is set for the print setting data D2 of the print data, a large-format printer performs the inscribed processing and a small-format printer performs the circumscribed processing as the arrangement processing for the printing image data D3. As a result, the print result may be different according to the printer type. Borderless printing refers to a printing method for printing an image protruding from the edges of at least two sides of a paper (recording medium) region on the paper region to obtain a print result where no margin exists on the edges of the at least two sides.

FIG. 4 illustrates different print results due to the different printer type of the transmission destination printer. FIG. 4 illustrates a region 20 of the input image data D1, a printable region 21, a region 22 of the input image data D1 arranged in the printable region 21, a paper region 23, and a borderless protruding region 26 drawn with dotted lines. The borderless protruding region 26 is used for borderless printing, indicating how much an image needs to be protruded from the paper region 23 to perform borderless printing. Information indicating the borderless protruding region 26 is acquired from the printer 4000 or the printer driver of the printer 4000 and then transmitted to the server computer 3000 by the print application 1500. The borderless protruding region 26 is a region where a recording material (such as ink and toner) is discharged by the printer. The region protruding from the paper region 23 out of the borderless protruding region 26 is not subjected to printing due to no paper. The printable region 21 may have an equivalent region size to the borderless protruding region 26. In this case, a region 24 (described below) has an equivalent region size to the region 22. In this case, the input image data D1 is enlarged to fit into the printable region 21 with a fixed aspect ratio and then arranged at the center of the printable region 21. Therefore, a difference arises between the upper sides and between the lower sides of the regions 21 and 22. The position where the input image data D1 is enlarged and arranged to fit into the printable region 21 is not limited to the center of the printable region 21. A difference may not arise between the upper sides and between the lower sides of the regions 21 and 22 depending on the aspect ratios of the input image data D1 and the printable region 21. A difference may or may not arise between the right sides and between the left sides of the regions 21 and 22 depending on the aspect ratios thereof. Further, when the size of the input image data D1 is larger than that of the printable region 21, the input image data D1 may be not enlarged but reduced before the arrangement.

As described above, the region 22 as a result of the enlargement/reduction processing on the region 20 is transmitted to the printer as the printing image data D3 as a result of the rendering processing, and then the printing image data D3 is arranged in the borderless protruding region 26. The arrangement processing for the printing image data D3 differs between the following cases A and B. In this case, the print result may be different between the two cases. In case A, the printer type is a large-format printer or a small-format printer, and borderless printing is not set (bordered printing is set). In case B, the printer type is a small-format printer and borderless printing is set.

In case A, for example, the inscribed processing is performed as the arrangement processing for the printing image data D3 in the region 26. For example, referring to FIG. 4, the printing image data D3 is arranged in the region 26 based on the size of the region 24. The inscribed processing refers to processing in which the printing image data D3 is subjected to the enlargement/reduction processing and then arranged so that the image region including the four sides of the printing image data D3 fits into the region 26.

More specifically, the inscribed processing is processing in which at least two of the four sides of the printing image data D3 are overlapped with at least two of the four sides of the region 26 so that all (four) sides of the printing image data D3 fit into the region 26 with a fixed aspect ratio of the printing image data D3. Although the printing image data D3 is arranged at the center of the region 26, the format is not limited thereto. The printing image data D3 may be arranged not at the center but arranged in a vertically or horizontally deviated way. In the inscribed processing, when the regions 24 and 26 have different aspect ratios, a difference may arise between the upper sides and between the lower sides of the regions 24 and 26, or a difference may arise between the right sides and between the left sides of the regions 24 and 26. When the regions 24 and 26 have the same aspect ratio, the four sides of the region 24 overlap with the four sides of the region 26. Therefore, no difference arises between the upper sides and between the lower sides of the regions 24 and 26, and no difference arises between the right sides and between the left sides of the regions 24 and 26.

For example, in case B, the circumscribed processing is performed as the arrangement processing for the printing image data D3 in the region 26. For example, referring to FIG. 4, the printing image data D3 is arranged in the region 26 based on the size of the region 25. The circumscribed processing refers to processing in which the printing image data D3 is subjected to the enlargement/reduction processing and then arranged so that two sides of the printing image data D3 are overlapped with two sides of the region 26, and the other two sides of the printing image data D3 protrude from the region 26. In the region protruding from the region 26 out of the region 25, the recording material (such as ink and toner) is not discharged by the printer.

More specifically, the circumscribed processing is processing in which at least either the horizontal or vertical sides of the printing image data D3 are overlapped with at least either the horizontal or vertical sides of the region 26, respectively, so that two sides of the printing image data D3 are arranged outside the region 26 with a fixed aspect ratio of the printing image data D3. Although the printing image data D3 is arranged at the center of the region 26, the format is not limited thereto. The printing image data D3 may be arranged not at the center but arranged in a vertically or horizontally deviated way. In the circumscribed processing, when the regions 22 and 26 have different aspect ratios, the two sides of the region 25 not overlapping with two sides of the region 26 and a part of the region 25 may protrude from the region 26. When the regions 25 and 26 have the same aspect ratio, the four sides of the region 25 overlap with the four sides of the region 26 and therefore a part of the region 25 does not protrude from the region 26.

As described above, the arrangement processing in which the printer arranges the printing image data D3 in the region 26 may differ according to whether the printer type is a large-format or a small-format printer. In this case, the print result (print product) may be different according to the printer type.

Further, the inscribed processing is image data arrangement processing suitable mainly for poster printing. Performing the inscribed processing reduces the possibility that texts in a poster are truncated. However, when performing poster printing in case B where the circumscribed processing is performed, texts in the poster may possibly be truncated after execution of the circumscribed processing.

Accordingly, the present example embodiment performs control so that a similar print result is obtained regardless of whether the type of the printer as a print data transmission destination is a large-format or a small-format printer. More specifically, when the rendering process is performed, the present example embodiment determines whether to generate the printing image data D3 with appended margins based on the printer type and whether borderless printing is specified. For example, in the above-described case B, margins are appended to the region corresponding to a difference between the regions 21 and 22. More specifically, when the region equivalent to the printable region 21 including the region 22 and margins is transmitted to the printer as the printing image data D3 as a result of the rendering processing, the circumscribed processing is performed.

Even when the printing image data D3 is subjected to the circumscribed processing, it is possible to obtain a print result similar to the print result when the printing image data D3 is subjected to the inscribed processing. More specifically, a similar print result can be obtained regardless of whether the printer type is a large-format or a small-format printer.

For poster printing, it is possible to reduce the possibility that texts in the poster are truncated even in case B where the circumscribed processing is performed.

In case B, if the user performs an editing operation to append margins at the time of image data generation, it is possible to obtain a print result equivalent to the print result when the inscribed processing is performed. However, the user may not recognize how much margins need to be appended to obtain a print result similar to the print result when the inscribed processing is performed. Further, since the user needs to add margins to the image data, the user will be burdened. According to the present example embodiment, therefore, when the rendering process is performed, the CPU automatically generates the printing image data D3 with appended margins in the regions corresponding to the differences between the regions 21 and 22 based on the printer type and whether borderless printing is specified. Thus, the user does not need to generate image data with appended margins, resulting in improved usability.

Figure 5:
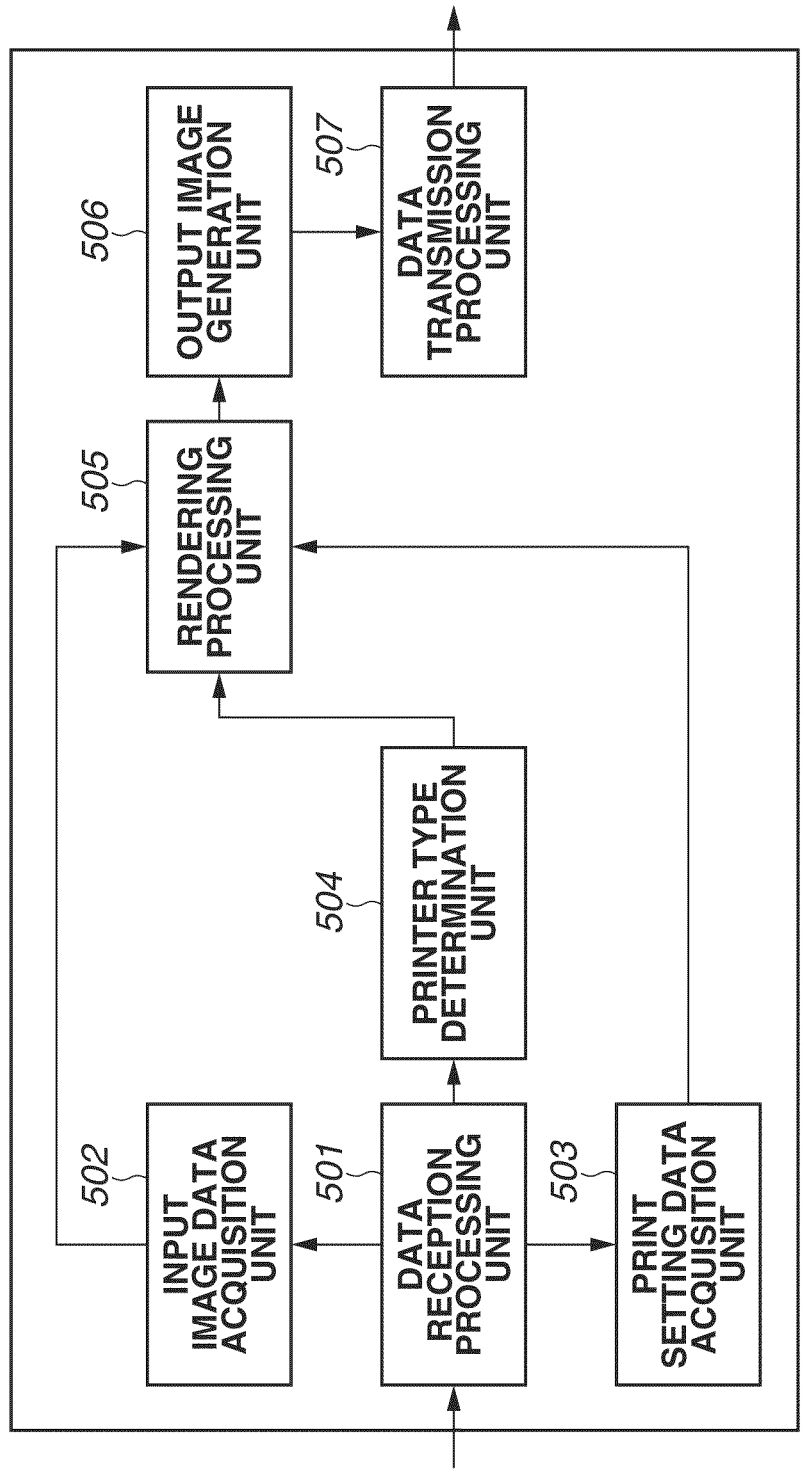
FIG. 5 illustrates a software configuration of the system.

FIG. 5 illustrates a software configuration of the system. FIG. 5 illustrates an example of a software configuration of the server computer 3000. Functions of the processing units in the rendering processing for generating printing image data will be described below with reference to FIG. 5.

The server computer 3000 includes a data reception processing unit 501, an input image data acquisition unit 502, a print setting data acquisition unit 503, a printer type determination unit 504, a rendering processing unit 505, an output image generation unit 506, and a data transmission processing unit 507.

As the data reception processing unit 501, the CPU 301 receives data related to the image data generation from the client computer 1000 or the mobile terminal 2000 via the communication I/F of each terminal. Examples of data related to the image data generation include the input image data, the print setting data, and transmission destination printer information. The CPU 301 as the data reception processing unit 501 stores the received data related to the image data generation in the external storage device 304 or the RAM 303.

As the input image data acquisition unit 502, the CPU 301 acquires the input image data (hereinafter referred to as the input image data D1) of the data received by the data reception processing unit 501. For example, the CPU 301 as the input image data processing unit 502 acquires an image file of the input image data D1. Examples of image data acquired as an image file include vector image data. Examples of compression formats in the image file generation include the Joint Photographic Experts Group (JPEG) format and the Scalable Vector Graphics (SVG) format. The compression format in the image file generation for the input image data D1 may be any desired format as long as the format can be converted into the printing image data D3 in the rendering processing (described below). The input image data D1 may be any image data as long as the image data can be converted into the printing image data D3 in the rendering processing (described below). The format of a file generated by compressing data through a certain compression format is also referred to as a compression format.

As the print setting data acquisition unit 503, the CPU 301 acquires the print setting data D2 of the data received by the data reception processing unit 501. The print setting data D2 includes the model information, paper feed method, paper size, paper type, print quality, whether borderless printing is specified, and whether to use special ink for the printer related to the generation of the printing image data D3 (described below). Alternatively, the print setting data D2 includes size information for the output image calculated based on various print settings.

As the printer type determination unit 504, the CPU 301 acquires printer type information as information about the type of the transmission destination printer 4000 out of the data received by the data reception processing unit 501 and determines the type of the printer 4000. The printer type information indicates information that can be used to determine whether the type of the transmission destination printer 4000 is a large-format printer or a small-format printer. Examples of the printer type information include command information indicating a large-format printer and a small-format printer.

The CPU 301 as the printer type determination unit 504 generates printer type determination information (hereinafter referred to as printer type determination information D4) that indicates whether the type of the printer 4000 determined based on the printer type information is a large-format printer or a small-format printer. Then, the CPU 301 transmits the printer type determination information D4 to the rendering processing unit 505.

As the rendering processing unit 505, the CPU 301 generates the printing image data D3 by using the print setting data D2 and the printer type determination information D4 based on the input image data D1. The CPU 301 as the rendering processing unit 505 acquires the input image data D1 acquired by the input image data acquisition unit 502. The CPU 301 also acquires the print setting data D2 acquired by the print setting data acquisition unit 503. The CPU 301 further acquires the printer type determination information D4 acquired by the printer type determination unit 504. Then, the CPU 301 as the rendering processing unit 505 generates the printing image data D3 by using the print setting data D2 and the printer type determination information D4 based on the input image data D1. The generation of the printing image data D3 will be described below with reference to FIG. 6.

As the output image generation unit 506, the CPU 301 generates an image file of the printing image data D3 generated by the rendering processing unit 505 (or performs output image generation processing).

Generating an image file is processing for reducing the data size of image data. For example, the CPU 301 as the output image generation unit 506 generates an image file of the printing image data D3 based on, for example, a compression format such as JPEG or Portable Network Graphics (PNG). A known technique is used as a method for generating an image file. When image data is compressed in the JPEG format, JPEG format data is generated. When image data is compressed in the PNG format, PNG format data is generated.

As the data transmission processing unit 507, the CPU 301 transmits an image file (output image data) generated by the output image generation unit 506 to other terminals via the data communication I/F 305. More specifically, the CPU 301 as the data transmission processing unit 507 transmits the print data to the client computer 1000 or the mobile terminal 2000. Then, the CPU 101 of the client computer 1000 or the CPU 201 of the mobile terminal 2000 transmits the print data to the printer 4000. The print data includes the generated image file and the print setting data D2 for issuing a print instruction. Further, the print setting data D2 also includes the paper size, whether two-sided printing is specified, whether borderless printing is specified, and whether to use special ink. The CPU 301 as the data transmission processing unit 507 may directly transmit the print data to the printer 4000 without interposing the client computer 1000 and the mobile terminal 2000.

Figure 6:
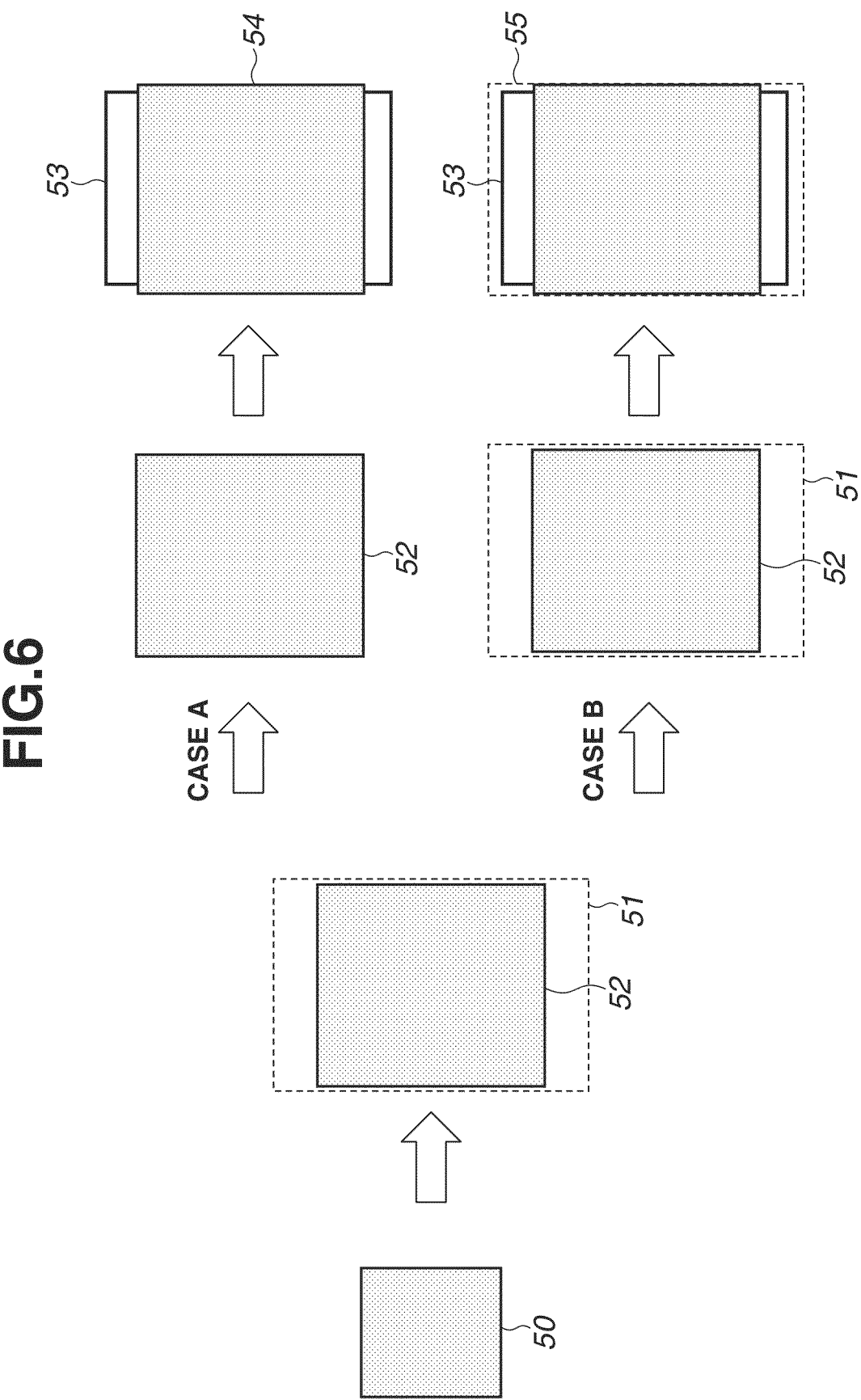
FIG. 6 illustrates rendering processing according to a printer type and borderless printing settings.

FIG. 6 illustrates the rendering processing according to the printer type and borderless printing settings. The CPU 301 as the rendering processing unit 505 performs the rendering processing with different margin states based on whether borderless printing is specified in the print setting data D2 and the printer type determination information D4.

FIG. 6 illustrates a region 50 of the input image data D1, a printable region 51, a region 52 of the input image data D1 arranged in the printable region 51, and a paper region 53.

The borderless protruding region (not illustrated) may have an equivalent region size to the printable region 51. In this case, the borderless protruding region has an equivalent size to the region 55 (described below).

The generation of the printing image data D3 will be specifically described below. The CPU 301 as the rendering processing unit 505 calculates a print region image size (hereinafter referred to as a print region image size P1) for paper based on the input image data D1 and the print setting data D2. More specifically, the CPU 301 calculates the size of the region 52. The calculation of the print region image size P1 will be specifically described below.

For example, the sizes of the width and height of the input image data D1 are 3,000 and 4,000 pixels, respectively. The print setting data D2 includes information having the A4 paper size and borderless printing settings. The sizes of the width and the height of the printable region size (hereinafter referred to as a printable region size P2) with respect to paper are 4,500 and 6,800 pixels, respectively. More specifically, the sizes of the width and the height of the region 51 are 4,500 and 6,800 pixels, respectively. The sizes of the width and the height of the printable region size P2 based on the setting contents may be prestored, or the sizes transmitted from the printer 4000 may be used. Then, the CPU 301 calculates the image size having been subjected to the enlargement/reduction processing so that the input image data D1 fits into the printable region size P2. More specifically, the CPU 301 calculates the image size so that the input image data D1 fits into the printable region size P2 while maintaining a fixed ratio of the width and the height (aspect ratio) of the input image data D1. The sizes of the width and the height of the input image data D1 are 3,000 and 4,000 pixels, respectively. The sizes of the width and the height of the printable region size P2 are 4,500 and 6,800 pixels, respectively. Therefore, with the image size that fits into the printable region size P2, the sizes of the width and the height are 4,500 and 6,000 pixels, respectively. This image size is referred to as a print region image size P1. Then, the CPU 301 generates image data as a result of enlarging or reducing the input image data D1 so that the data fits into the calculated print region image size P1. In this case, the input image data D1 is enlarged to fit into the region 51 with a fixed aspect ratio and then arranged at the center of the region 51. Therefore, there arises a difference between the upper sides and between the lower sides of the regions 51 and 52. The position where the input image data D1 is enlarged to fit into the region 51 and then arranged is not limited to the center. Depending on the aspect ratio of the input image data D1, a difference may not arise between the upper sides and between the lower sides of the regions 51 and 52, and a different may or may not arise between the right sides and between the left sides of the regions 51 and 52. Further, when the input image data D1 has a larger size than the region 51, the input image data D1 is not enlarged but reduced before the arrangement.

Then, the CPU 301 determines whether to append margins to the regions corresponding to the differences between regions 51 and 52 based on the print setting data D2 and the printer type determination information D4. More specifically, the CPU 301 identifies the printer 4000 as a large-format printer or a small-format printer based on the printer type determination information D4. When the printer 4000 is a small-format printer, the CPU 301 determines whether borderless printing is set, based on the print setting data D2. When the printer 4000 is a small-format printer and borderless printing is set (the above-described case B), the CPU 301 appends margins to the regions corresponding to the differences between the regions 51 and 52. Then, the region equivalent to the region 51 including the region 52 of the image data as a result of enlarging or reducing the input image data D1 and the region where margins are appended form the region of the printing image data D3. When the printer 4000 is a large-format printer or when the printer 4000 is a small-format printer and borderless printing is not set (the above-described case A), the CPU 301 does not append margins to the regions corresponding to the differences between regions 51 and 52. Then, the region 52 of the image data as a result of enlarging or reducing the input image data D1 forms the region of the printing image data D3.

In case A, a region 54 is illustrated as an image where the printing image data D3 is arranged in the borderless protruding region. The region 54 is arranged in the borderless protruding region (not illustrated) through the inscribed processing. More specifically, in case A, the region 52 indicating the printing image data D3 not including margins is arranged in the region 54 through the inscribed processing. In case B, a region 55 is illustrated as an image where the printing image data D3 is arranged in the borderless protruding region. The region 55 is arranged in the borderless protruding region (not illustrated) through the circumscribed processing. More specifically, in case B, the region equivalent to the region 51 indicating the printing image data D3 including margins is arranged in the region 55 through the circumscribed processing. When RGB values for white color data indicating margins, for example, (R, G, B) = (255, 255, 255), are input, the printer 4000 does not discharge ink. In case B, since no ink is discharged to the margins in the printing image data D3, a print result equivalent to the print result in case A can be obtained.

Figure 7:
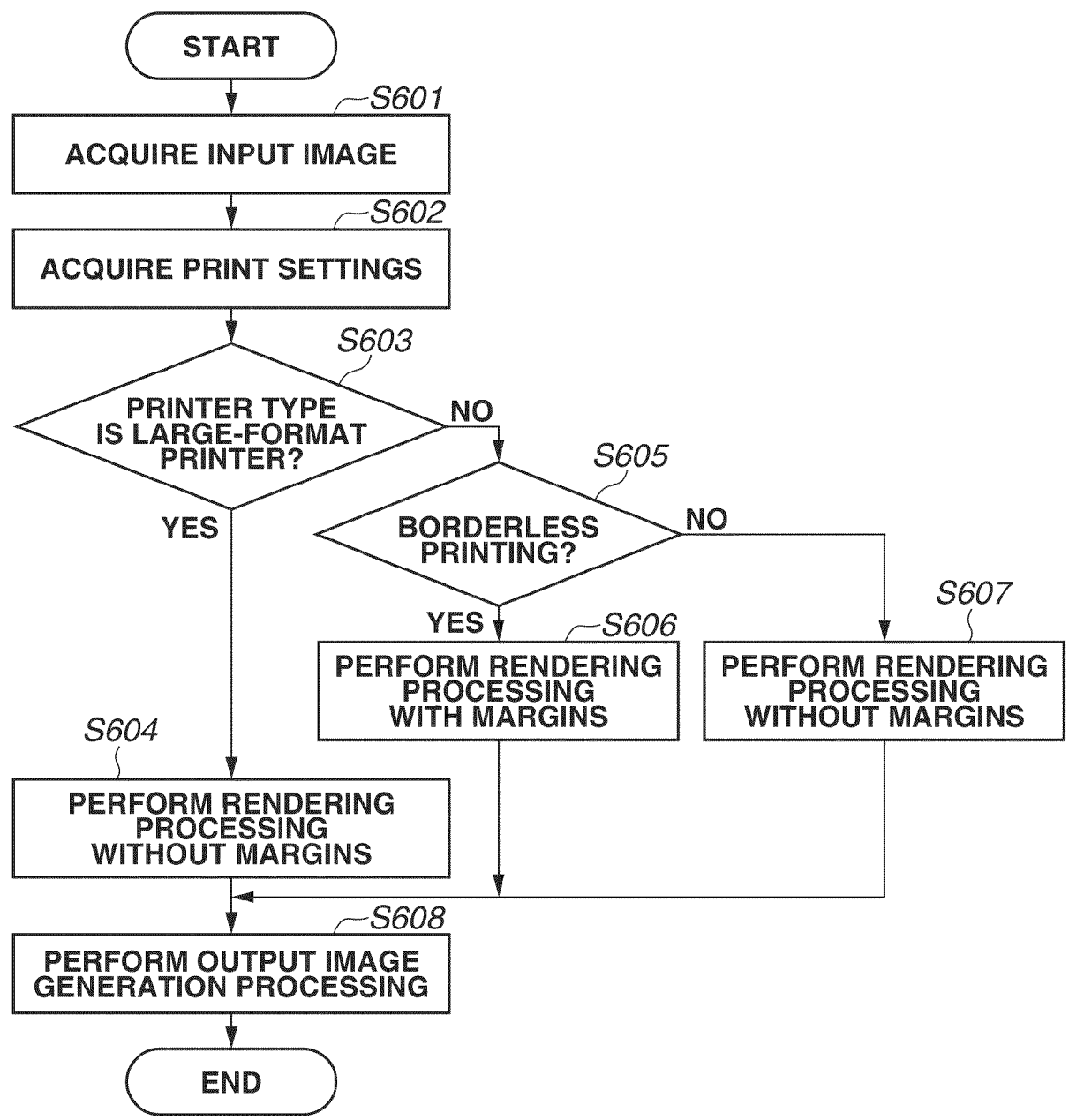
FIG. 7 is a flowchart illustrating processing for determining rendering processing according to the printer type and the borderless printing settings and performing the rendering processing.

FIG. 7 is a flowchart illustrating processing for determining the rendering processing according to the printer type and borderless printing settings to perform the rendering processing. More specifically, this flowchart determines whether to append margins in the rendering processing and performs the rendering processing. Processing in each step of the flowchart in FIG. 7 is implemented when the CPU 301 of the server computer 3000 reads and executes the program related to the processing of the flowchart.

The flowchart in FIG. 7 is started, for example, when the server computer 3000 receives an instruction for generating the printing image data D3 from the terminal that holds the print application 1500.

In step S601, the CPU 301 as the input image data acquisition unit 502 in FIG. 5 performs input image acquisition processing. More specifically, the CPU 301 acquires the input image data D1 from among the data received by the data reception processing unit 501 in FIG. 5. Examples of the input image data include photographic image data acquired through image capturing by an imaging apparatus. Examples of the input image data also include image data as a result of image editing by using software and the web application 1400. Examples of the input image data further include image data in the Hyper Text Markup Language/Cascading Style Sheets (HTML/CSS) format, vector image data in the SVG format, and image data in the JPEG format that can be displayed by a browser. The input image data may be any type of data as long as it can be converted into printing image data in the rendering processing (described below). The CPU 301 stores the acquired image data D1 in the external storage device 304 or the RAM 303.

In step S602, the CPU 301 as the print setting data acquisition unit 503 in FIG. 5 performs print setting acquisition processing. More specifically, the CPU 301 acquires the print setting data D2 from among the data received by the data reception processing unit 501 in FIG. 5. Examples of the print setting data D2 include the printer model information selected by the user with the setting item 701 in FIG. 3A, paper feed information, paper size, paper type, print quality, and whether borderless printing is specified. These pieces of the print setting data D2 are pieces of information related to the rendering size calculation. Examples of information about the rendering size calculation include the printable region size P2. For example, the printable region size P2 changes according to the printer model, the paper type (cut sheet, roll sheet, etc.) set in the printer and the paper size out of paper feed information, and the paper quality (high quality paper, low quality paper (plain paper), etc.). The printable region size P2 also changes according to the print quality setting (high image quality and low image quality). The printable region size P2 also changes according to bordered printing and borderless printing. The CPU 301 acquires special ink settings, such as whether to use special ink, the use intensity of special ink, and color values for using special ink, set in the print setting data D2. The CPU 301 stores the acquired print setting data D2 in the external storage device 304 or the RAM 303.

The CPU 301 further acquires information that can be used by the printer type determination unit 504 in FIG. 5 to determine the printer type, as the printer type information. The printer type information can be used to determine whether the type of the transmission destination printer 4000 is a small-format printer or a large-format printer. For example, certain command information indicates a large-format printer or a small-format printer.

In step S603, the CPU 301 as the printer type determination unit 504 in FIG. 5 determines whether the type of the transmission destination printer 4000 is a large-format printer or a small-format printer. More specifically, based on the printer type information, the CPU 301 determines whether the transmission destination printer 4000 is a large-format printer or a small-format printer, generates the printer type determination information D4 that indicates the determination result, and transmits the printer type determination information D4 to the rendering processing unit 505. When the CPU 301 determines that the printer 4000 is a large-format printer (YES in step S603), the processing proceeds to step S604. On the other hand, when the CPU 301 determines that the printer 4000 is a small-format printer (NO in step S603), the processing proceeds to step S605.

When the transmission destination printer 4000 is a large-format printer, the CPU 301 performs the inscribed processing as the arrangement processing for the printing image data D3 regardless of whether borderless printing is specified, and therefore does not determine whether borderless printing is specified.

In step S604, the CPU 301 determines not to append margins in the rendering processing, and performs the rendering processing as the rendering processing unit 505 in FIG. 5. More specifically, in the rendering processing, the CPU 301 does not append margins to the regions corresponding to the differences between the regions 51 and 52 in FIG. 6. More specifically, the CPU 301 determines to set the region 52 as the region of the printing image data D3 and generates the printing image data D3.

In step S605, the CPU 301 determines whether borderless printing is set, based on the print setting data D2. When the CPU 301 determines that borderless printing is set (YES in step S605), the processing proceeds to step S606. On the other hand, when the CPU 301 determines that borderless printing is not set (NO in step S605), the processing proceeds to step S607. The CPU 301 needs to determine which of borderless printing and bordered printing is set.

In step S606, the CPU 301 determines to append margins in the rendering processing, and performs the rendering processing as the rendering processing unit 505 in FIG. 5. More specifically, in the rendering processing, the CPU 301 appends margins to the regions corresponding to the differences between the region 51 and 52 in FIG. 6. More specifically, the CPU 301 determines to set the region equivalent to the region 51 including margins as the region of the printing image data D3 and generates the printing image data D3.

Processing in step S607 is similar to the processing in step S604, and redundant descriptions thereof will be omitted.

In step S608, the CPU 301 as the output image generation unit 506 generates an image file (output image data). More specifically, the CPU 301 performs processing for reducing the data size of the printing image data D3. For example, the CPU 301 generates an output image through the compression processing. Although the compression processing is performed based on the JPEG or PNG format, the format is not limited thereto. Further, the data size of the printing image data D3 may be reduced by reducing the image size of the printing image data D3 instead of performing the compression processing.

The CPU 301 as the data transmission processing unit 507 transmits the print data including the image file and the print setting data to the client computer 1000 via the data communication I/F 305. Then, printing is started when the CPU 101 of the client computer 1000 transmits the print data including the image file and the print setting data to the printer 4000 via the data communication I/F 105. When the print data including the image file and the print setting data may be transmitted to the mobile terminal 2000, the CPU 201 may transmit the print data including the image file and the print setting data D2 to the printer 4000 via the data communication I/F 205. The CPU 301 as the data transmission processing unit 507 may directly transmit the print data to the printer 4000 without interposing the client computer 1000 and the mobile terminal 2000.

FIGS. 8A and 8B are flowcharts illustrating processing in which the printer 4000 determines the arrangement processing for the printing image data D3 and performs the print processing. FIG. 8A is a flowchart to be performed when the printer 4000 is a small-format printer, and FIG. 8B is a flowchart to be performed when the printer 4000 is a large-format printer. Processing in each step of the flowcharts in FIGS. 8A and 8B is implemented when the printer controller 402 of the printer 4000 reads and executes the program related to the processing of the flowchart. More specifically, the processing is implemented when the CPU of the printer controller 402 reads and executes the program related to the processing of the flowchart. The flowcharts in FIGS. 8A and 8B are started, for example, upon reception of the print data including the image file and the print setting data transmitted from the server computer 3000, the client computer 1000, or the mobile terminal 2000.

The flowchart to be performed when the printer 4000 is a small-format printer illustrated in FIG. 8A will be described below.

In step S801, the printer controller 402 acquires an image file generated by the server computer 3000. When the image file is loaded (decompressed), the printing image data D3 is obtained.

Processing in step S802 is similar to the processing in step S602, and redundant descriptions thereof will be omitted.

Processing in step S803 is similar to the processing in step S605, and redundant descriptions thereof will be omitted. A small-format printer switches the arrangement processing for the printing image data D3 according to whether borderless printing is specified in the print setting data D2. Therefore, the printer determines whether borderless printing is set. When the printer controller 402 determines that borderless printing is set (YES in step S803), the processing proceeds to step S804. On the other hand, when the CPU 301 determines that borderless printing is not set (NO in step S803), the processing proceeds to step S805.

In step S804, the printer controller 402 determines to perform the circumscribed processing as the arrangement processing for the printing image data D3, and subjects the printing image data D3 to the circumscribed processing.

In step S805, the printer controller 402 determines to perform the inscribed processing as the arrangement processing for the printing image data D3, and subjects the printing image data D3 to the inscribed processing.

In step S806, the printer controller 402 instructs the printer engine 403 to perform the print processing for the printing image data D3 based on the print setting data D2.

The flowchart to be performed when the printer 4000 is a large-format printer illustrated in FIG. 8B will be described below.

Processing in step S811 is similar to the processing in step S801, and redundant descriptions thereof will be omitted.

Processing in step S812 is similar to the processing in step S802, and redundant descriptions thereof will be omitted.

Processing in step S813 is similar to the processing in step S805, and redundant descriptions thereof will be omitted. A large-format printer performs the inscribed processing as the arrangement processing for the printing image data D3 regardless of whether borderless printing is specified in the print setting data D2. Therefore, the printer does not determine whether borderless printing is set.

Processing in step S814 is similar to the processing in step S806, and redundant descriptions thereof will be omitted.

According to the present example embodiment, the CPU 301 determines whether to generate the printing image data D3 with appended margins based on the printer type and whether borderless printing is specified. More specifically, when the printer type is a small-format printer and borderless printing is set, the circumscribed processing is performed as the arrangement processing for the printing image data D3. Therefore, the CPU 301 generates the printing image data D3 with appended margins. This makes it possible to obtain a print result equivalent to the print result when the inscribed processing is performed, even if the printing image data D3 is subjected to the circumscribed processing.

This also makes it possible, in poster printing, to reduce the possibility that texts in the poster are truncated even in case B where the circumscribed processing is performed.

Further, this makes it unnecessary for the user to generate image data with appended margins, resulting in improved usability.

Although, in the present example embodiment, the CPU 301 determines whether borderless printing is set when the printer type is a small-format printer, the present invention is not limited thereto. In a configuration that premises borderless printing, the server computer 3000 does not need to determine whether borderless printing is set. For example, in the case of a print application that does not permits the selection of whether borderless printing is specified but premises borderless printing, the server computer 3000 does not need to determine whether borderless printing is set. In this case, in the flowchart in FIG. 7, the CPU 301 does not perform the processing in step S605 and does not need to perform the processing in step S607 when bordered printing is determined to be set. More specifically, when the printer type is determined to be a small-format printer in step S603, the CPU 301 may perform the rendering processing for generating the printing image data D3 with appended margins.

According to the present example embodiment, the CPU 301 determines whether to append margins in the rendering processing based on the determination about whether the printer type is a large-format printer or a small-format printer and whether borderless printing is set. However, in a configuration where the arrangement processing for the printing image data D3 performed by the printer is not switched by the printer type and borderless printing settings, the CPU 301 may determine the rendering processing based on information that enables determining the arrangement processing for the printing image data D3. For example, even if the printer type is a large-format printer, the arrangement processing for the printing image data D3 may be different according to whether the printer supports only a cut sheet or supports roll paper in addition to a cut sheet. For example, if the printer is a large-format printer that supports only cut paper, for example, the circumscribed processing is performed as the arrangement processing for the printing image data D3. In this case, the CPU 301 may determine whether to append margins in the rendering processing based on information that enables determining that the arrangement processing for the printing image data D3 performed by the printer is the circumscribed processing. The information that enables determining the arrangement processing for the printing image data D3 performed by the printer refers to tag or command information that enables determining which of the inscribed processing and the circumscribed processing is to be performed.

Even if the transmission destination printer is a large-format printer, the CPU 301 may determine whether borderless printing is specified in a case where the arrangement processing for the printing image data D3 depends on whether borderless printing is specified. Then, the CPU 301 may determine whether to append margins in the rendering processing based on the determination whether borderless printing is set.

According to the present example embodiment, the CPU 301 uses the printer type information as information indicating whether the printer type is a large-format printer or a small-format printer. However, other information is also applicable as long as the information indicates that the printer type is a large-format printer or a small-format printer. For example, when a large-format printer is used, print data is often transmitted via the printer driver as a communication method. When a small-format printer is used, print data is often transmitted by using a command without interposing the printer driver as a communication method. Therefore, the CPU 301 may use information about the communication method to determine whether the printer is a small-format printer or a large-format printer.

According to the present example embodiment, the server computer 3000 determines whether to append margins in the rendering processing based on the printer type and borderless printing settings, and then performs the rendering processing. However, the client computer 1000 or the mobile terminal 2000 may perform this processing. More specifically, the client computer 1000 or the mobile terminal 2000 may hold a software configuration as illustrated in FIG. 5, perform the flowchart in FIG. 7, and transmit the print setting data to the printer 4000 via other apparatuses. The client computer 1000 or the mobile terminal 2000 may directly transmit the print data to the printer 4000 without interposing other apparatuses.

According to the first example embodiment, the server computer 3000 determines whether to append margins in the rendering processing based on the printer type and borderless printing settings, and then performs the rendering processing. A second example embodiment will be described below centering on a configuration where the print application 1500 determines whether to append margins in the rendering processing based on the printer type and borderless printing settings, and the server computer 3000 performs the rendering processing.

FIG. 9 is a flowchart illustrating processing in which the print application 1500 determines whether to append margins in the rendering processing based on the printer type and the borderless printing settings. Referring to FIG. 9, the print application 1500 will be described below as the entity for each processing. However, the corresponding function is actually implemented when a processor such as the CPU 101 in the client computer 1000 or the CPU 201 in the mobile terminal 2000 executes the corresponding program. Not all of processing is sequentially executed on a single process. In some cases, process may be once transferred to the side of the operating system (OS), and then the process may be called again from the OS. FIG. 9 is a flowchart conveniently illustrating the main processing of the print application 1500 in a comprehensible way.

Processing in step S901 is similar to the processing in step S602, and redundant descriptions thereof will be omitted. The print application 1500 may generate information about the rendering processing based on the print setting data D2 acquired in step S901, and issue a print instruction to the server computer 3000.

Processing in step S902 is similar to the processing in step S603, and redundant descriptions thereof will be omitted. When the print application 1500 determines that the printer type is a large-format printer (YES in step S902), the processing proceeds to step S903. On the other hand, when the print application 1500 determines that the printer type is a small-format printer (NO in step S902), the processing proceeds to step S904.

In step S903, the print application 1500 determines not to append margins in the rendering processing. More specifically, the CPU determines not to append margins to the regions corresponding to the differences between the regions 51 and 52 in FIG. 6 in the rendering processing. More specifically, the CPU 201 determines to assume the region 52 as the region of the printing image data D3.

Processing in step S904 is similar to the processing in step S605, and redundant descriptions thereof will be omitted. When borderless printing is set (YES in step S904), the processing proceeds to step S905. On the other hand, when borderless printing is not set (NO in step S904), the processing proceeds to step S906.

In step S905, the print application 1500 determines to append margins in the rendering processing. More specifically, the print application 1500 determines to append margins to the regions corresponding to the differences between the regions 51 and 52 in FIG. 6 in the rendering processing. More specifically, the CPU 201 determines to set the region equivalent to the region 51 including margins as the region of the printing image data D3.

Processing in step S906 is similar to the processing in step S903, and redundant descriptions thereof will be omitted.

In step S907, the print application 1500 transmits processing information indicating whether to append margins in the rendering processing to the server computer 3000 outside the terminal apparatus. The print application 1500 also transmits the print setting data D2 and an instruction for generating the printing image data D3. The instruction for generating the printing image data D3 refers to an instruction (information) for performing the rendering processing based on the processing information indicating whether to append margins in the rendering processing and then generating the printing image data D3. The print application 1500 may further transmit an image file generation instruction. The print application 1500 may generate information about the rendering processing based on the print setting data D2 acquired in step S901 and transmit information about the rendering processing to the server computer 3000. More specifically, the print application 1500 may calculate the printable region size P2 based on print setting information and then transmit the size P2 to the server computer 3000.

FIG. 10 is flowchart illustrating the rendering processing performed by the server computer 3000 based on information indicating whether to append margins in the rendering processing from the print application 1500. The flowchart in FIG. 10 is started, for example, when the server computer 3000 receives the instruction for generating the printing image data D3 from the terminal that holds the print application 1500.

Steps S1001, S1002, and S1004 are similar to steps S601, S602, and S608, respectively, and redundant descriptions thereof will be omitted. In step S1002, the CPU 301 acquires processing information indicating whether to append margins in the rendering processing. The CPU 301 also acquires the print setting data D2 and an instruction for generating the printing image data D3. When an image file generation instruction is transmitted, the CPU 301 further acquires the image file generation instruction. When information about the rendering processing is transmitted, the CPU 301 further acquires the information about the rendering processing. More specifically, the server computer 3000 acquires the printable region size P2. When the information about the printable region size P2 is transmitted as information about the rendering processing, the server computer 3000 does not need to acquire information about the calculation of the printable region size P2 out of the print settings.

In step S1003, the CPU 301 performs similar processing to step S604 or S606 based on the processing information indicating whether to append margins in the rendering processing. More specifically, when the information about whether to append margins in the rendering processing indicates that margins are not to be appended in the rendering processing, the CPU 301 performs similar processing to step S604. When the information about whether to append margins in the rendering processing indicates that margins are to be appended in the rendering processing, the CPU 301 performs similar processing to step S606.

The CPU 301 as the data transmission processing unit 507 transmits print data including the generated image file and the print setting data to the client computer 1000 or the mobile terminal 2000 via the data communication I/F 305. Then, the CPU 101 of the client computer 1000 or the CPU 201 of the mobile terminal 2000 transmits the print data including the image file and the print setting data to the printer 4000. Therefore, the printer 4000 arranges the printing image data D3 in the borderless protruding region and then starts printing. The CPU 301 may directly transmit the print data to the printer 4000 without interposing the client computer 1000 and the mobile terminal 2000.

The present example embodiment has been described above centering on a configuration where the print application 1500 determines whether to append margins in the rendering processing based on the printer type and borderless printing settings, and the server computer 3000 performs the rendering processing based on an instruction from the print application 1500. This makes it possible to obtain a print result equivalent to the print result when the inscribed processing is performed, even if the printing image data D3 is subjected to the circumscribed processing.

According to the present example embodiment, in step S902, the print application 1500 determines whether the printer 4000 is a large-format printer or a small-format printer based on the printer type information. Then, the print application 1500 generates the printer type determination information D4 based on the determination result, and determines whether to append margins in the rendering processing. However, in step S902, the print application 1500 may generate the printer type determination information D4 based on the determination result and then transmit the information to the server computer 3000. Then, the CPU 301 of the server computer 3000 may perform the remaining processing in FIG. 9 based on the received printer type determination information D4. More specifically, when the printer type determination information D4 indicates a large-format printer, the CPU 301 may perform step S903. On the other hand, when the printer type determination information D4 indicates a small-format printer, the CPU 301 may perform the determination in step S904 and then perform the processing in step S905 or S906.

Other Example Embodiments

The above-described example embodiments are examples of configurations for obtaining effects of the present disclosure. When equivalent effects are obtained by using similar other techniques or different parameters, these are also included in the scope of the present invention. Various embodiments of the present disclosure are applicable to a system including a plurality of apparatuses (such as a host computer, an interface device, a reader, and a printer) and an apparatus including one apparatus (such as a printer, a copier, or a facsimile apparatus).

Although processing of the above-described example embodiments is implemented by a print application, a browser, and programs running on a server, operating in a collaborative way, the present invention is not limited thereto. For example, one application (integrated application) including a print application, a browser program, and programs running on a server is mounted on the client computer 1000, in other embodiments. In these cases, the CPU 101 of the client computer 1000 may execute the integrated application to perform the processing of the above-described example embodiments. In addition, when the integrated application is mounted on the mobile terminal 2000, the CPU 201 of the mobile terminal 2000 may execute the integrated application to perform the processing of above-described example embodiments.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-124183, filed Jul. 29, 2021, which is hereby incorporated by reference herein in its entirety.

What is claimed is:

1. A control method for an information processing apparatus, the control method comprising:
   acquiring, at the information processing apparatus, print setting information about printing of image data including setting information about borderless printing;
   acquiring printer type information about a type of a printer for printing the image data; and
   determining, at a processor configured to perform the determining, to perform processing for generating the image data without appending margins in a case where the printer type is identified to be a large-format printer based on the printer type information, and determining, at the processor configured to perform the determining, to perform processing for generating the image data with appended margins in a case where the printer type is identified to be a small-format printer based on the printer type information and the borderless printing is identified to be executed based on the print setting information.

2. The method according to claim 1, wherein the image data is printing image data generated for printing based on information about input image data input by a user and information about a printable region with respect to paper included in the print setting information.

3. The method according to claim 2, wherein the margins are appended to regions corresponding to differences between the input image data and the printable region, the input image data having been subjected to at least one of enlargement processing or reduction processing to fit into the printable region.

4. The method according to claim 1, wherein, in a case where the printer type is identified to be a small-format printer based on the printer type information and borderless printing is identified not to be executed based on the print setting information, the method further comprises determining to perform processing for generating the image data without appending margins.

5. The method according to claim 1, further comprising causing the computer to transmit processing information indicating the processing for generating the image data determined in the determination and the print setting information to a server outside an apparatus including the computer,
   wherein the server performs the processing for generating the image data based on the processing information.

6. The method according to claim 1, further comprising causing the computer to execute the processing for generating the image data based on processing information indicating the processing for generating the image data determined in the determination.

7. The method according to claim 1, wherein, an image file is generated through execution of processing for reducing a data size of the image data.

8. The method according to claim 7,
   wherein print data including the print setting information and the image file are transmitted to the printer, and
   wherein the image data is printed.

9. The method according to claim 1,
   wherein, in a case where the image data generated without appended margins is transmitted to the printer, inscribed processing is performed as arrangement processing for the image data on a region for borderless printing, and
   wherein, in a case where the image data generated with appended margins is transmitted to the printer, circumscribed processing is performed as arrangement processing for the image data on the region for borderless printing.

10. The method according to claim 9,
    wherein the inscribed processing is processing for overlapping at least two sides of the image data with at least two sides of the region for borderless printing so that four sides of the image data fit into the region for borderless printing without changing an aspect ratio of the image data, and
    wherein the circumscribed processing is processing for overlapping at least two sides of the image data with at least two sides of the region for borderless printing so that two sides of the image data protrude from the region for borderless printing without changing the aspect ratio of the image data.

11. The method according to claim 9, wherein the region for borderless printing is a region where occurrence of borders of at least two sides is prevented in a print product in a case where the image data is printed.

12. The method according to claim 9, wherein the region for borderless printing is a region where a printer arranges the image data so that the image data protrudes from a recording medium and discharges a recording material.

13. The method according to claim 9, wherein the region for borderless printing is a region equivalent to a printable region with respect to paper.

14. An information processing apparatus comprising:
    a setting acquisition unit configured to acquire, at the information processing apparatus, print setting information about printing of image data including setting information about borderless printing;
    an acquisition unit configured to acquire printer type information about a type of a printer for printing the image data; and
    a determination unit configured to determine, at a processor configured to perform the determining, to perform processing for generating the image data without appending margins in a case where the printer type is identified to be a large-format printer based on the printer type information, and determine, at the processor configured to perform the determining, to perform processing for generating the image data with appended margins in a case where the printer type is identified to be a small-format printer based on the printer type information and the borderless printing is identified to be executed based on the print setting information.

15. A non-transitory storage medium storing a program for causing a computer to execute:
    acquiring print setting information about printing of image data including setting information about borderless printing;
    acquiring printer type information about a type of a printer for printing the image data; and
    determining, at a processor configured to perform the determining, to perform processing for generating the image data without appending margins in a case where the printer type is identified to be a large-format printer based on the printer type information, and determining, at the processor configured to perform the determining, to perform processing for generating the image data with appended margins in a case where the printer type is identified to be a small-format printer based on the printer type information and the borderless printing is identified to be executed based on the print setting information.

* * * * *